Feb. 18, 1969    L. H. BARRON    3,427,752
EDGE BEVELING MACHINE FOR NON-METALLIC SHEETS
Filed Sept. 12, 1966    Sheet 1 of 3

INVENTOR.
LEE H. BARRON
BY
ATTORNEY

INVENTOR.
LEE H. BARRON
BY
ATTORNEY

INVENTOR.
LEE H. BARRON
BY
ATTORNEY 3,427,752
EDGE BEVELING MACHINE FOR
NON-METALLIC SHEETS
Lee H. Barron, 4515 Alta Canyoda Road,
La Canada, Calif. 91011
Filed Sept. 12, 1966, Ser. No. 578,587
U.S. Cl. 51—92                5 Claims
Int. Cl. B24b 9/00; B24d 5/00

ABSTRACT OF THE DISCLOSURE

A machine specifically for beveling the edges of printed circuit boards wherein the bevel angle is accurately cut relative to one face of the circuit board, and the depth of cut is precisely adjustable. A circuit board is adjustably clamped on a reciprocable table which is passed across the peripheral face of a rapidly rotated cylindrical abrasive wheel positioned therebelow. A micrometer adjustable means is disposed adjacent the forward edge of the table and is adapted to fix the depth of bevel cut of the adjustably clamped circuit board.

---

This invention relates to a machine for accurately cutting an edge bevel on pieces of sheet material composed of synthetic plastic, ceramics, glass, or the like, and particularly for beveling printed circuit boards, based upon these sheet materials.

One object of the invention is to provide a machine for uniformly edge-beveling pieces of non-metallic sheet materials. Another object is to provide in an edge beveling machine, means for regulating the angle of the bevel. Another object is to provide in an edge beveling machine, means for accurately adjusting the depth of the bevel. A still further object is to provide an edge beveling machine which employs a high speed diamond-faced peripheral grinding wheel. Another object is to provide a machine for beveling the edges of printed circuit boards.

These and other objects are attained by my invention, which will be understood from the following description, reference being made to the accompanying drawings showing a preferred form in which FIG. 1 is a perspective view of a preferred form of my beveling machine;

Figure 1:
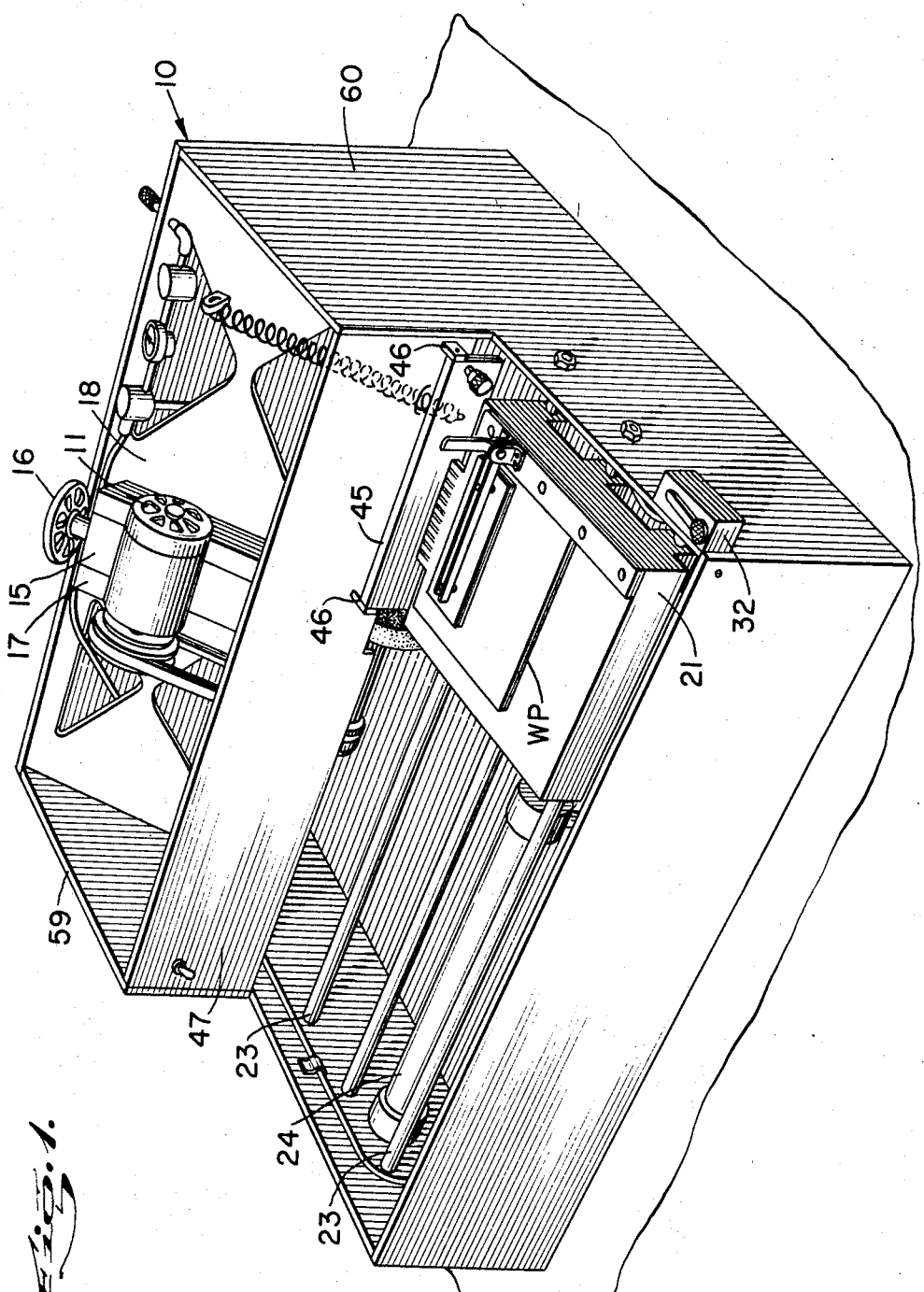

The preferred form of the beveling machine as shown in the drawings consists of a box-like metal frame 10 which encloses and supports the parts of the machine. A back portion contains the motor 11, a belt 12, a drive spindle 13 on which the diamond wheel 14 is mounted, the slide base 15 which holds the motor and wheel spindle, and a hand screw means 16 for positioning the slide base 15 on its tracks 17. The tracks 17 for the slide base 15 are mounted on a partition member 18 which is disposed at 45° angle from horizontal, so that the grinding wheel face 19 meets the work at different bevel angles depending upon the wheel face contacting position, as indicated by the angular indexing marks 20 on the side face of the wheel 14, as will be more fully explained below. I prefer to use a diamond faced grinding wheel having diamonds about 240 mesh in order to produce a fine bevel surface. The grinding of the bevel from the underside produces a bevel surface which is in alignment with the surface of the sheet which is held against the face of the work table.

In the front portion of the frame 10 is the work table 21 which is mounted by means of bearings 22 on parallel slide rods 23 which extend from the right end 60 to the left end 59 of the box frame, and parallel to the spindle 13 on which the grinding wheel 14 is mounted. An elongated air cylinder 24 is connected to the work table 21 by the pivot pin 25 in the bracket 26 which extends below the table 21. Compressed air lines 27 and 28 are connected respectively to the two ends of the air cylinder 24, hand-set valves 29 and 30 being provided in the air lines 27 and 28 respectively to control the rate of movement in both directions of the work table 21. The source of compressed air 31 is connected through the hand-operated main shut-off valve 32 to an air filter 33, a pressure gauge 34, and an oil catching reservoir 35, and then to the inlet air line 36 which is connected to a switching manifold device 37, this being operatively connected by air lines 38 and 39 to air release valves 40 and 41 which limit and reverse the movements of the work table 21. The switching manifold 37 is also operatively connected to the two compressed air lines 27 and 28 which actuate the piston 24' in said air cylinder 24.

Figure 2:
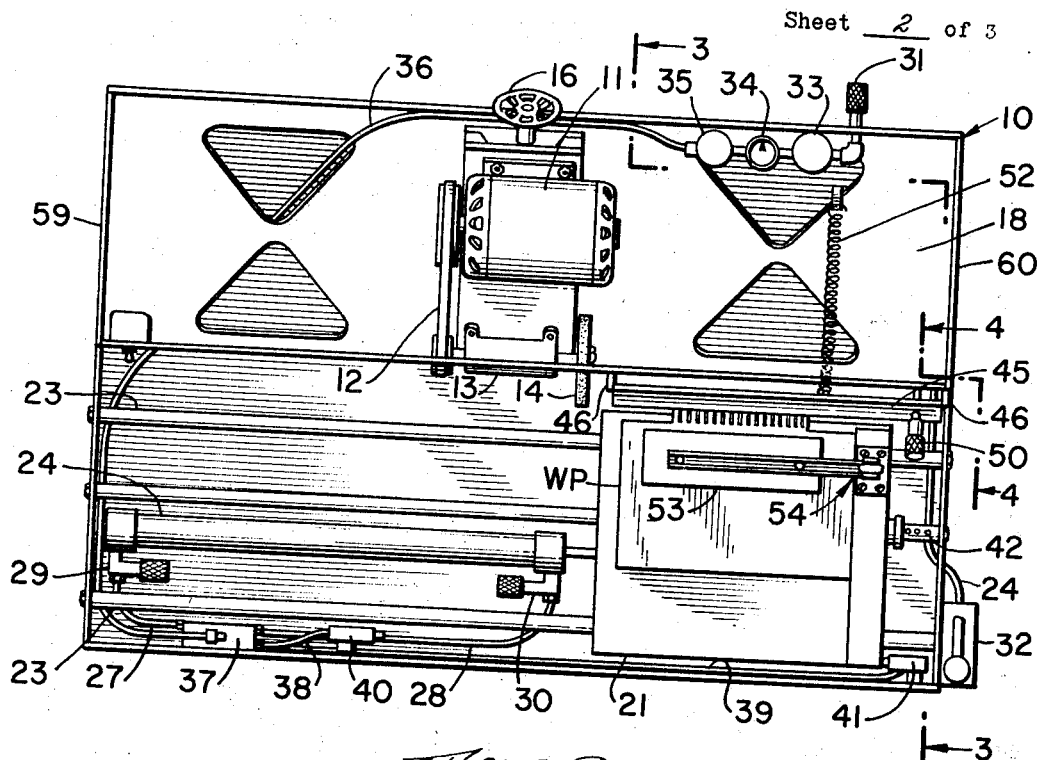
FIG. 2 is a top plan view of the same.
Figure 3:
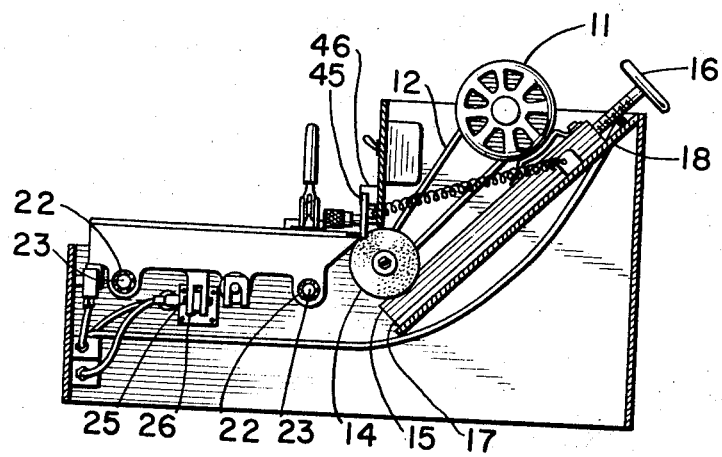
FIG. 3 is a cross-sectional view taken on the line 3—3 of FIG. 2.

The travel limits of the work table may be set by stop pins 42 on one of the slide rods 23, as indicated on FIG. 2.

An edge guide plate 45 for the work piece W.P. is hingedly supported from the brackets 46 at the ends of the guide plate, the brackets extending forwardly from the vertical divider plate 47 of the frame 10, pivot pins 48 being provided. The guide plate 45 extends below the surface of the work table 21 at its edge 49 adjacent the grinding face of the grinding wheel 14, and its position relative to the edge of the table is fixed by the attached micrometer gauge 50 whose stem 51 abuts the surface of the divider plate 47, the guide plate being spring biased by the attached coil spring 52 whose other end is anchored to the angular partition member 18. The width of the bevel which is cut on the work piece is fixed by the positioning of the guide plate 45, and is measured by the micrometer reading.

A holddown device to hold the work piece W.P. firmly on the table consists of a clamping bar 53 which is pressed down by the toggle means 54 actuated by the hand lever 55, the supporting yoke 56 for the toggle means being attached to the top surface 57 of the work table 21 by the screws 58.

Figure 4:
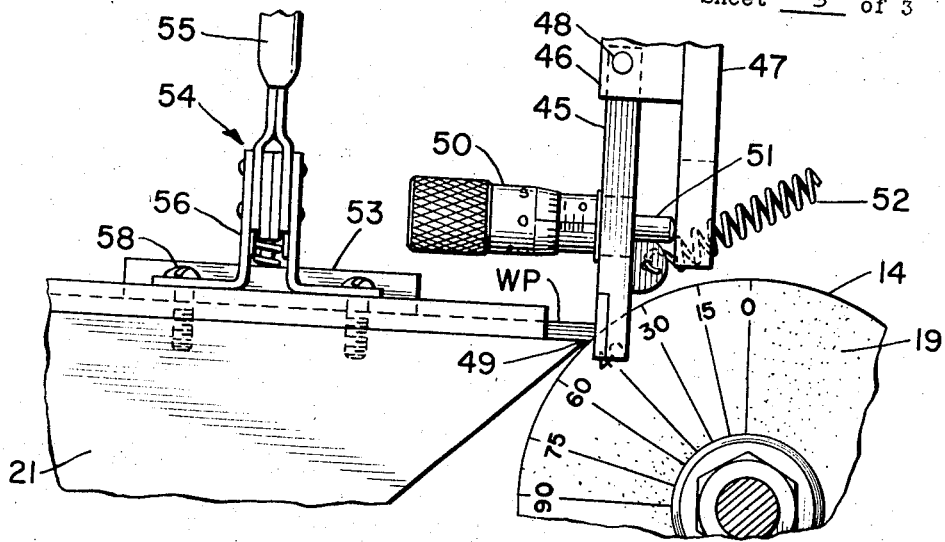
FIG. 4 is a fragmentary end elevational view taken from the position 4—4 of FIG. 2.
Figure 5:
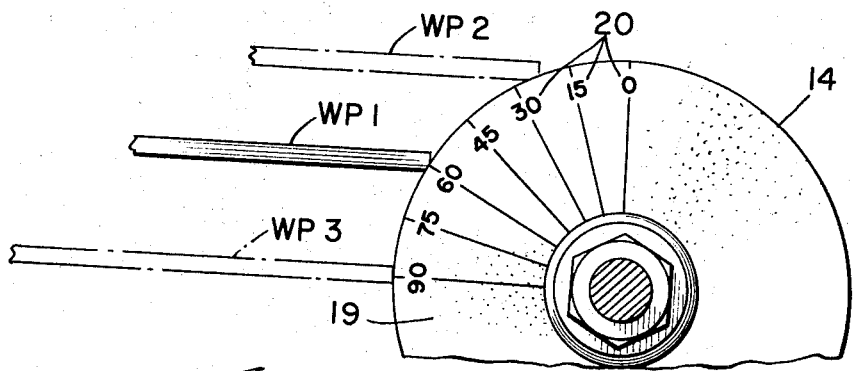
FIG. 5 is a diagrammatic representation of the use of angular index marks on the side face of the diamond faced grinding wheel, and the effect of the elevation of the grinding wheel axis in fixing the angle of the bevel cut by the wheel.
Figure 6:
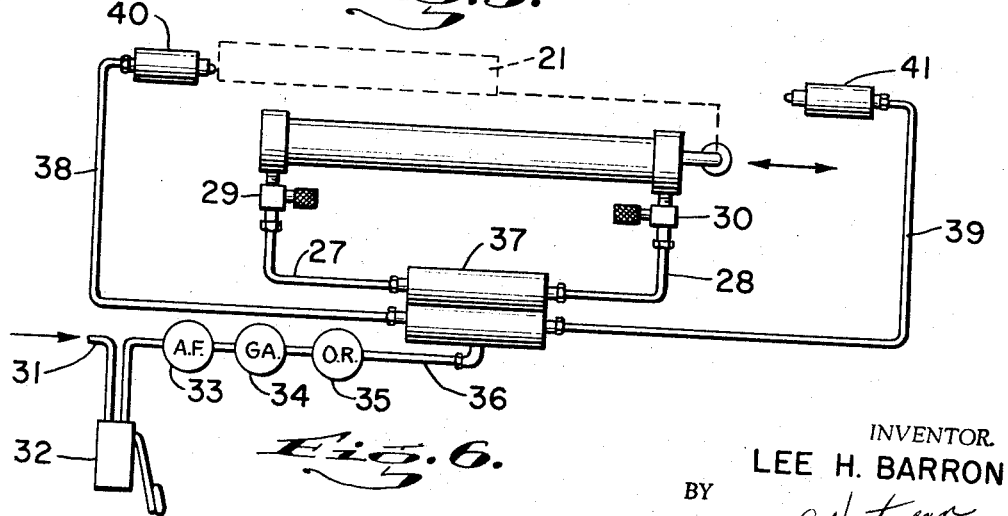
FIG. 6 is a diagrammatic representation of the compressed air system for reciprocating the work table of the machine.

The angle of the bevel cut is regulated by the positioning of the grinding wheel cutting surface, as shown diagrammatically in FIG. 4. As previously described, the grinding wheel side face 19 is provided with indexing marks 20 placed at various angular positions from 0 to 90° in a quarter segment of the circular side face of the wheel. With the 0° index placed in the vertical position, a 60° bevel, for example, will be cut when the top surface 57 of the work table 21 (or the surface of the work piece WP–1 which is resting on the work table) is aligned with the grinding wheel grinding surface at the 60° index line, this alignment being effected by the up or down moving of the motor and grinding wheel slide base in its tracks 17 by means of the hand screw 16. Other angles of bevel may be cut by other positions of the W.P. (and work table surface) as indicated at WP–2 and WP–3. The bevel surface which is cut by the wheel is not a true plane surface but corresponds to the cylindrical contour of the wheel, but for thin work pieces W.P., relative to the diameter of the grinding wheel, the deviation from a plane surface is not significant. A separate angle index wheel may be used in place of the grinding wheel.

The machine of this invention is particularly useful in producing bevel surfaces aligned with a selected top or bottom surface of a non-metallic plate or base on which a "printed circuit" (electrical) is dveloped. The accuracy of the bevel cut is important in making the electrical connections at the edges of such printed circuit boards.

The advantages of my machine will be apparent from the above description. The objectives set forth in the beginning have been attained.

I claim:

1. An edge beveling machine for use in beveling an edge of a piece of non-metallic sheet comprising in combination a rapidly rotated cylindrical abrasive wheel, a reciprocable horizontal table for passing an edge of a sheet to be beveled across the peripheral face of said abrasive wheel whose axis is disposed below the elevation of the lower face of said sheet; means for adjusting the position of the axis of said abrasive wheel relative to the sheet edge to be beveled whereby the angle between the sheet surface and the tangent line at the point of contact of said sheet on said wheel periphery is the selected angle from the horizontal of said bevel surface; and micrometer adjustable means disposed adjacent the forward edge of said table for fixing the depth of said bevel cut.

2. The machine defined in claim 1 in which the means for adjusting the position of the axis of said abrasive wheel relative to the sheet edge to be beveled consists of a mounting base slidable at 45° from horizontal, upon which base is mounted a motorized abrasive wheel, including means for fixing the slidable base at a selected position, whereby the elevational and forward position of the periphery of said wheel relative to the sheet edge to be beveled brings said wheel periphery in contact with said edge at a tangent angle which is equal to the selected bevel angle.

3. An edge beveling machine adapted for accurately beveling the edges of non-metallic sheets comprising in combination a box-like frame upon which the several elements are mounted; a high speed motor, a peripheral surface grinding wheel mounted on a spindle, driving means for driving said spindle by said motor; a slide base upon which are mounted said motor, said spindle, and said grinding wheel, said slide base being positioned at 45° from horizontal, and having screw means for varying the elevtaional and forward positions of said spindle and its grinding wheel to a selected grinding position relative to a work table; a reciprocatable work table mounted forwardly of said grinding wheel surface on fixed slide bars disposed parallel to said spindle axis to carry the work piece edge across the grinding surface of said grinding wheel; means for reciprocating said work table, adjustable means including a hinged guide plate and a micrometer gauge for accurately positioning the edge of the work piece on which the bevel is to be produced, relative to the work table edge; and releasable means for rigidly clamping a sheeted work piece to the table.

4. An edge beveling machine as defined in claim 3, in which one end of said peripheral surface grinding wheel is provided with radial index marks corresponding to the several angles in a quadrant, a selected one of said index marks when aligned visually with the edge of the lower face of said sheet determining the correct position of the axis of said grinding wheel at which the selected angle of bevel will be cut when the sheet is passed across the surface of the rotated grinding wheel.

5. The machine defined in claim 4, in which the said radial index marks are alternatively applied to a disk mounted coaxially with said grinding wheel.

References Cited

UNITED STATES PATENTS

| | | | |
|---|---|---|---|
| 2,052,837 | 9/1936 | Makaroff | 51—92 X |
| 2,183,699 | 12/1939 | Schweiker | 51—92 X |
| 2,238,704 | 4/1941 | Miller | 51—92 X |
| 2,315,104 | 3/1943 | Baldenhofer | 51—92 X |
| 2,782,570 | 2/1957 | Ische | 51—92 X |
| 2,802,318 | 8/1957 | Sturdy | 51—92 X |
| 2,830,413 | 4/1958 | Dahlerup | 51—231 |
| 2,857,671 | 10/1958 | Nelson | 51—207 X |
| 3,100,954 | 8/1963 | Di Lella | 51—165 |
| 3,324,600 | 6/1967 | Wilson | 51—74 |

LESTER M. SWINGLE, *Primary Examiner.*

D. G. KELLY, *Assistant Examiner.*